Figure 1:
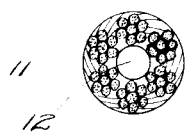

J. D. TEW.
TUBULAR CORD.
APPLICATION FILED NOV. 11, 1913.

1,144,079.

Patented June 22, 1915.
2 SHEETS—SHEET 1.

Witnesses:
C. E. Burnap
Henry A. Parks

Inventor:
James D. Tew
By Sheridan, Wilkinson and Scott Attys

J. D. TEW.
TUBULAR CORD.
APPLICATION FILED NOV. 11, 1913.

1,144,079.

Patented June 22, 1915.
2 SHEETS—SHEET 2.

Witnesses:

Inventor:
James D. Tew

UNITED STATES PATENT OFFICE.

JAMES D. TEW, OF AKRON, OHIO.

TUBULAR CORD.

1,144,079.  Specification of Letters Patent.  Patented June 22, 1915.

Application filed November 11, 1913. Serial No. 800,337.

*To all whom it may concern:*

Be it known that I, JAMES D. TEW, a citizen of the United States, residing at Akron, in the county of Summit and State of Ohio, have invented certain new and useful Improvements in Tubular Cord, of which the following is a specification.

My invention relates in general to pneumatic tire casings and more particularly to an improved cord for use in forming the layers of strain-resisting fabric in the tire casings.

It is well-known that when a solid cord of round cross section is wound on a form having the shape of a pneumatic tire, there are necessarily open spaces between the adjacent convolutions of the cord on the outer periphery, such spaces being greatest at the tread, or outside diameter, and gradually decreasing as they reach the inner diameter. When the ordinary solid round cord is used it is impracticable to fill these open spaces between the adjacent convolutions of the cord by the application of pressure, inasmuch as the cord cannot be flattened sufficiently to cause the adjacent convolutions to contact with each other and thereby close such spaces. Consequently the layers of strain-resisting fabric formed by the convolutions of cord are not uniform around the tread, but comprise spaced cords.

The primary object of my invention is to provide a cord for use in making the layers of strain-resisting fabric in tire casings, which, when subjected to a moderate degree of pressure, will flatten so as to almost fill the gradually decreasing spaces between adjacent convolutions of the cord, thereby producing a strain-resisting fabric composed of cords separated only by a thin insulation of rubber. I accomplish this object by employing cords with a hollow center so that by applying a moderate degree of pressure to them after they are wound their cross section near the outer diameter, or tread of the tire casing, will be appreciably elongated, thereby nearly filling the larger open spaces adjacent the tread, and filling the gradually decreasing open spaces extending from the tread to the side edges of the casing.

The process of making tire casings by laying the hollow cords of this invention on a former and thereafter flattening them by pressure is described and claimed in my copending application No. 856,621, filed August 13, 1914. The tire casing itself, built with the hollow cords of this invention, is described and claimed in my copending application No. 833,248, filed April 20, 1914. The present application relates to the cord itself, which has the capacity of normally holding its shape but of being flattened by pressure to produce the desired result.

My invention will be more fully disclosed hereinafter with reference to the accompanying drawings, in which the same is illustrated as embodied in a convenient and practical form, and in which—

Figure 2:
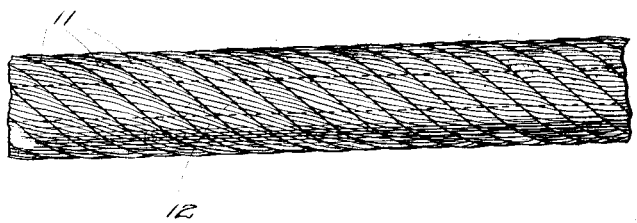
Figure 3:
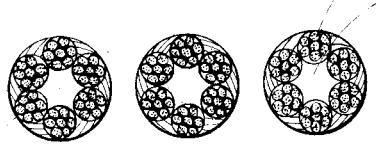
Figure 4:
Figure 5:
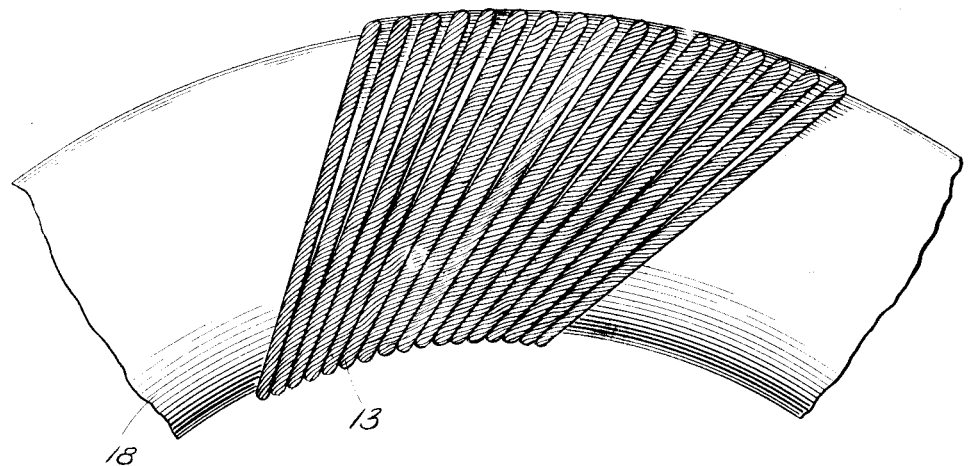
Figure 6:
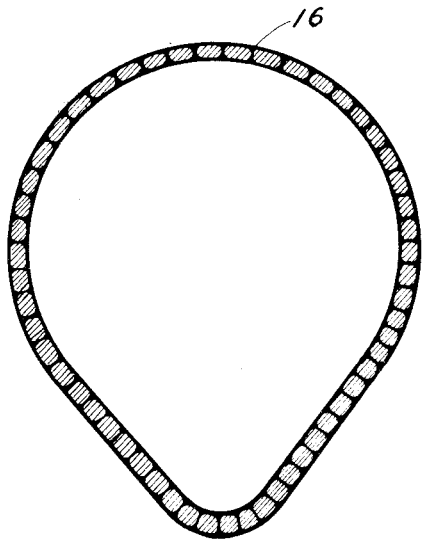

Figure 1 is an enlarged cross sectional view of my improved cord; Fig. 2 a side elevational view of a short length of the cord; Fig. 3 an enlarged cross section of adjacent convolutions of the cord before being subjected to pressure; Fig. 4 a view similar to Fig. 3 showing adjacent convolutions after being subjected to pressure, such section being taken at the tread of a tire where the flattening of the cords is greatest; Fig. 5 an elevational view of a portion of a form upon which has been wound a number of convolutions of my improved cord before applying pressure to the cords; Fig. 6 a cross sectional view of a tire casing after pressure has been applied thereto; and Fig. 7 a cross section of a tire casing comprising superposed layers of convolutions of my improved cord.

The particular cord illustrated in the drawings is formed of six strands 11, twisted side by side around a hollow center 12. Each strand 11 is formed in the usual manner of a plurality of smaller strands. The strands 11 are rubberized or otherwise treated with an adhesive coat permeating them more or less and thus rendering them adhesive and giving them a degree of stiffness. In this way the tubular cord will maintain its shape unless subjected to a moderate degree of transverse pressure.

A suitable machine for making my tubular cord is described and claimed in my application No. 833,249, filed April 20, 1914.

My improved cord is wound upon a mandrel 18 so as to form an inner layer 13 of convolutions in the manner I employ in constructing cord tire casings. By reference to Fig. 5 it will be seen that when the adjacent convolutions of the cord are in contact at the inner periphery of the mandrel gradually increasing space will be formed between adjacent convolutions extending from the inner periphery of the mandrel around the sides thereof to the outer periphery. After the cord has been wound around the mandrel, it is subjected to a moderate degree of pressure which flattens the cord so that the adjacent convolutions thereof are separated only by a thin insulation of rubber. The cross section imparted to the cord by such pressure is indicated in Figs. 6 and 7 by reference to which it will be seen that the portions of the convolutions at the tread are flattened into practically rectangular form, as indicated in Fig. 4, while the cross section of the cords at the sides of the tire are more nearly square, as the spaces to be filled at the sides of the tire are narrower than the spaces at the tread of the tire and hence the cord is least flattened at the sides and gradually increased in flatness toward the tread.

After the layer of cord has been subjected to pressure, a thin coating of rubber 16 is applied thereto which tends to fill any slight openings which may remain between the adjacent convolutions of the cord, thereby insulating the convolutions of the cord from each other.

A second layer 14 is formed upon the first layer by winding the cord to form continuous convolutions around the first layer. If desired more than two layers of cord may be provided. The convolutions of adjacent layers are inclined in opposite directions so that the planes of the outer layer intersect the planes of the convolutions of the inner layer. The thin coating of rubber 16 serves as an insulating medium between the adjacent layers of cord, as well as between the adjacent convolutions of cord in each layer.

Figure 7:
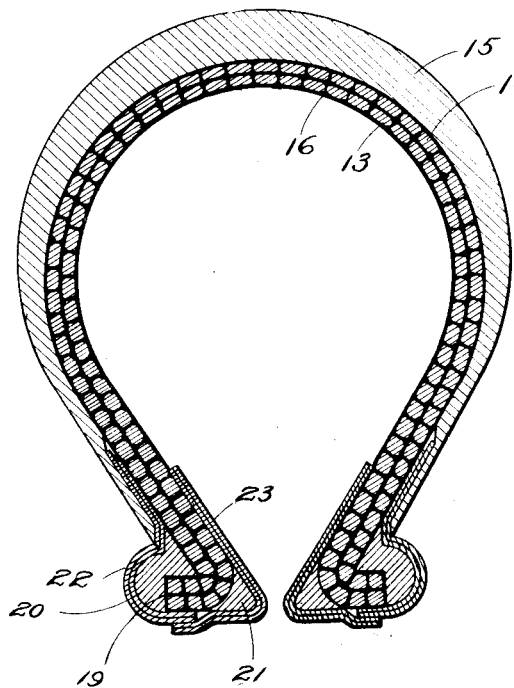

In Fig. 7 I have shown my improved cord embodied in a tire casing which may be made by the process disclosed in my co-pending application Serial No. 856,621, referred to, in which the superposed layers of cord are split around the inner periphery of the form and their severed edges folded back into grooves 19 formed in beads 20, and in which a filler 21 is applied along each inner edge of the casing so as to impart to the bead a sharp toe.

22 designates a strip of frictioned fabric applied to each side of the tire casing adjacent the inner edge thereof and extending around the bead 20 and overlapping the adjacent outwardly folding edge of the cord layers 13 and 14.

23 designates strips of frictioned fabric formed around the filler 21 at each inner edge of the side of the casing and overlapping the adjacent edge of the strip 22.

While I have illustrated my improved cord as embodied in a tire casing of the construction produced by the process disclosed in my above identified co-pending application, yet it will be understood that my improved hollow cord is not limited in its use to tire casings of such construction, but is applicable to other specific forms of tire casings.

From the foregoing description it will be observed that I have invented an improved hollow cord for use in constructing tire casings, which owing to its compressibility permits the formation of layers of convolutions thereof in which the spaces between adjacent convolutions are practically closed by the flattening of the cord to an extent corresponding to the gradually decreasing sizes of the spaces from the tread toward the sides of the tire casing.

I claim:

1. A cord for tire casings consisting of a plurality of strands wound side by side around a hollow center and treated with an adhesive material to impart to the cord a definite normal shape but capable of being flattened under pressure.

2. A hollow twisted rubber treated textile cord.

3. A cord made of a number of rubber-impregnated strands twisted together about a central bore.

4. A hollow cord made of strands impregnated with rubber and twisted together.

5. A cord composed of strands impregnated with rubber or similar substance and twisted about a central bore, the strands being cemented to each other by rubber.

6. A cord for tire casings and similar purposes consisting of a plurality of strands twisted side by side about a hollow center and treated with adhesive material to impart to the cord a definite normal shape capable of being flattened under pressure.

7. A hollow cord composed of adhering textile strands twisted together.

In testimony whereof, I have subscribed my name.

JAMES D. TEW.

Witnesses:
J. V. BLAKE,
L. A. SMITH.